(12) United States Patent
McKeough

(10) Patent No.: US 10,179,972 B2
(45) Date of Patent: Jan. 15, 2019

(54) METHOD FOR UTILIZING LIGNIN SEPARATED FROM BLACK LIQUOR AS LIME-KILN FUEL

(71) Applicant: ANDRITZ OY, Helsinki (FI)

(72) Inventor: Paterson McKeough, Tähtelä (FI)

(73) Assignee: ANDRITZ OY, Helsinki (FI)

(*) Notice: Subject to any disclaimer, the term of this patent is extended or adjusted under 35 U.S.C. 154(b) by 218 days.

(21) Appl. No.: 15/316,668

(22) PCT Filed: May 26, 2015

(86) PCT No.: PCT/FI2015/050361
§ 371 (c)(1),
(2) Date: Dec. 6, 2016

(87) PCT Pub. No.: WO2015/185794
PCT Pub. Date: Dec. 10, 2015

(65) Prior Publication Data
US 2017/0159238 A1    Jun. 8, 2017

(30) Foreign Application Priority Data
Jun. 6, 2014  (FI) ..................................... 20145519

(51) Int. Cl.
*D21C 11/00* (2006.01)
*C04B 2/10* (2006.01)

(52) U.S. Cl.
CPC .......... *D21C 11/0007* (2013.01); *C04B 2/108* (2013.01); *D21C 11/00* (2013.01);
(Continued)

(58) Field of Classification Search
CPC .......................... D21C 11/0042; D21C 11/007
(Continued)

(56) References Cited

U.S. PATENT DOCUMENTS 2,623,040 A    12/1952  Keilen, Jr. et al.
2008/0047674 A1 *  2/2008  Ohman .............. D21C 11/0007
                                                                162/16
(Continued)

FOREIGN PATENT DOCUMENTS

EP          1 794 363       2/2012
WO     WO 2008/079072       7/2008

OTHER PUBLICATIONS

Richardson Brian, Kraft Lignin as a Fuel for the Rotary Lime Kiln, 1991, University of British Columbia.*

(Continued)

*Primary Examiner* — Anthony Calandra
(74) *Attorney, Agent, or Firm* — Nixon & Vanderhye P.C.

(57) ABSTRACT

A method of utilizing lignin-containing material separated from spent kraft pulping liquor including: acidifying the liquor to a pH not less than seven thereby precipitating solid particles, separating precipitated solid particles from the accompanying liquid, and subjecting the separated precipitated solid particles to a washing process in which: the separated precipitated solid particles are washed with an aqueous medium or aqueous media in one or more washing steps, in each one of the washing steps, the aqueous washing medium contains, in a dissolved form, significant amounts of one or more added sodium salts, and a combined concentration of the added sodium salts in the washing medium in each of the washing step exceeds three percent by weight; and utilizing as fuel in a lime kiln at least part of the washed lignin-containing material is utilized as fuel in a lime kiln of a pulp mill.

20 Claims, 1 Drawing Sheet

(52) U.S. Cl.
CPC ...... *D21C 11/0021* (2013.01); *D21C 11/0035* (2013.01); *D21C 11/0042* (2013.01); *Y02P 40/44* (2015.11)

(58) Field of Classification Search
USPC .......................................... 530/500; 162/16
See application file for complete search history.

(56) References Cited

U.S. PATENT DOCUMENTS

| | | | | |
|---|---|---|---|---|
| 2008/0051566 | A1* | 2/2008 | Ohman | D21C 11/0007 530/500 |
| 2008/0214796 | A1 | 9/2008 | Tomani et al. | |
| 2011/0297340 | A1* | 12/2011 | Kouisni | D21C 11/0007 162/16 |
| 2014/0200334 | A1* | 7/2014 | Lake | D21C 11/0007 530/500 |

OTHER PUBLICATIONS

International Search Report for PCT/FI2015/050361, dated Aug. 28, 2015, 2 pages.
Written Opinion of the ISA for PCT/FI2015/050361, dated Aug. 28, 2015, 5 pages.
Search Report for FI 20145519, dated Feb. 4, 2015, 1 page.

* cited by examiner

METHOD FOR UTILIZING LIGNIN SEPARATED FROM BLACK LIQUOR AS LIME-KILN FUEL

RELATED APPLICATIONS

This application is the U.S. national phase of International Application PCT/FI2015/050361 filed May 26, 2015, which designated the U.S. and claims priority to Finnish Patent Application 20145519 filed Jun. 6, 2014, the entire contents of each of which are incorporated by reference.

TECHNICAL FIELD

Lignin may be removed from spent kraft pulping liquor (black liquor) by first acidifying the liquor and then separating the resulting lignin precipitate from the accompanying liquor. The present method is a novel way of utilizing lignin prepared by subjecting the crude separated lignin to a certain type of washing process. After possible partial or complete drying, the washed lignin is utilized as fuel in a lime kiln of a pulp mill.

PRIOR ART

The most commonly applied method for recovering reasonably pure lignin from spent kraft pulping liquor, commonly termed black liquor, involves the following steps:
1. Acidification of the liquor to a pH typically in the range 9-10 (value at 25° C.) using an acid such as carbon dioxide ($CO_2$) or sulphuric acid ($H_2SO_4$)
2. Separation of the solid particles thus precipitated by e.g. filtering the slurry
3. Washing the separated material, usually a filter cake, at low pH, typically around pH 2 (value at 25° C.), using an acidified aqueous solution
4. As required, further washing of the separated material, usually at low pH.

The two main washing principles, well known and widely used, are (1) the re-slurry principle, according to which the separated material is taken from the separation device, mixed with the washing medium and subsequently re-separated, and (2) the displacement principle, according to which the separated material is left in/on the separation device, usually a filter, and the solution entrained in the separated material is pushed out of the material by the washing medium. Some of the known methods for recovering lignin from black liquor specify one or other of these washing principles.

Filtration is the usual method employed for separating the lignin precipitated in the acidification step and, in the case of a re-slurry wash, for separating the washed solids from the wash slurry. One type of filtration device that is suitable for these purposes is the so-called filter press. Another is the belt filter.

Use of acid in the first washing step—Step 3 above—liberates sodium still bound to the lignin after the primary acidification stage and restricts re-dissolution of lignin in the aqueous washing medium. For example, re-dissolution may be essentially prevented by carrying out the wash at a pH of 2 or less. However, a relatively large amount of acid is required in order to reach this low pH level in the first washing step. To achieve the desired level of purity, two-stage washing is normally performed. In other words, both Steps 3 and 4 above are included. The residual content of sodium in the lignin product is typically below 1% of dry matter, and often below 0.5%. For example, the method disclosed in the European Patent 1794363B1 employs a two-step washing process of the type outlined above (Steps 3 and 4). According to Example 2 in that patent document, the residual sodium content is, in the worst case, around 0.25%, with contents less than 0.1% being readily attainable. (In the document it is not stated explicitly whether these contents are expressed in terms of dry or moist lignin material. If expressed in terms of moist material, then, for a typical lignin moisture content of 35%, the corresponding numbers in terms of lignin dry matter would be about 0.4% and 0.15%, respectively.) A need to reach low residual levels of sodium in the washed lignin product is emphasized in U.S. Pat. No. 8,252,141B2. It is noteworthy that, in this case, utilization of the lignin product as lime-kiln fuel is specifically mentioned as a main option (column 3, rows 12-16; column 4, rows 1-4, claim 14). This method yields a lignin product with a sodium content below 1% of dry matter (10 kg of sodium per ton of dry matter), preferably below 0.2% of dry matter, and most preferably below 0.1% of dry matter.

$H_2SO_4$ has usually been proposed as the acid for washing lignin separated from black liquor. Not only is $H_2SO_4$, generally speaking, the least costly mineral acid, but also, because sulphur is a process element in the kraft process, negligible amounts of foreign elements are introduced into the chemical recovery cycle as a result of the utilization of $H_2SO_4$. On the other hand, the introduction of sulphur disturbs the sodium-sulphur balance of the mill. The end result is an increase in the requirement for sodium make-up in the form of sodium hydroxide (NaOH) or sodium carbonate ($Na_2CO_3$). Usually this goes hand in hand with an increase in the amount of recovery-boiler ash that is purged rather than recycled. Thus, the effective price of the $H_2SO_4$ used for lignin washing becomes much higher than its purchase price.

An alternative strategy for minimizing re-dissolution of lignin in the first lignin-washing step is to increase the ionic strength of the aqueous washing medium, for example, by adding soluble salts such as sodium sulphate ($Na_2SO_4$) prior to, or in conjunction with, the washing step. This strategy has been incorporated, for example, in the methods described in the documents U.S. Pat. No. 2,623,040 and US patent application 2008/0214796A1. In the former document it is proposed that a salt solution be employed in the first washing step expressly for the purpose of preventing lignin re-dissolution. In the method described in the latter document, salt and/or acid is added, as needed, to a washing medium employed in conjunction with the first filtration step (by either diluting the slurry before filtration or carrying out a displacement wash on the filter). The need, as stated in the description of the method, is to prevent re-dissolution of lignin during the washing step. If more acid is employed, less salt is required. A disadvantage of adding salt rather than acid is that a much larger amount of added impurity (salt) is left entrained in the post-wash solid material. When a relatively pure lignin is sought for, this means a greater demand for further washing in comparison to the corresponding washing chain that employs acid, only, in the first step.

One of most attractive utilization options for the lignin product is as a fuel in a lime kiln of a pulp mill. Relatively expensive purchased fossil fuels, such as fuel oil or natural gas, may be replaced by the internally produced lignin. In the prior art, the content of sodium in lignin material designated for use as lime-kiln fuel has been kept at a low level. This is in line with the known purity requirements for the lime mud introduced into the lime kiln. A typical such requirement is that the maximum soluble alkali content in the lime mud, calculated as sodium oxide ($Na_2O$), is 0.3% of the weight of lime-mud dry matter. The requirement for a low sodium content in lime-kiln fuel has, in turn, led to the conclusion that lignin separated from black liquor needs to be thoroughly washed, e.g. according to the traditional sequence presented earlier, if it is to be utilized as lime-kiln fuel. Indeed, this has been the case in all previous evaluations and investigations. For example, in the publication Uloth V. C. and Wearing J. T., Pulp Paper Canada, 90 (1989) 10, pp. T357-T360, it is stated that a two-stage acidic wash, similar to that outlined in Steps 3 and 4 above, would be required if the lignin were to be used as the main fuel in the lime kiln. This conclusion was, in turn, based on operational experiences in lime kilns with different levels of sodium in the lime mud introduced into the kiln. These experiences are discussed in another publication by the same authors: Uloth V. C. and Wearing J. T., Pulp Paper Canada, 90 (1989) 9, pp. T310-T314. Trials, in which lignin recovered from black liquor was successfully tested as fuel in a lime kiln, are described in two publications: (1) Richardson, B., et al, Combustion of lignin in a pilot lime kiln, Tappi Journal, 73 (12): 133-137 (1990) and (2) Berglin, N., et al, Experiences from feeding and co-firing of lignin powder in a lime kiln, Proc. 2010 International Chemical Recovery Conference, Vol. 1, TAPPI Press, Atlanta, pp. 175-187. The lignin materials employed in all these tests had been separated and washed according to all the Steps 1-4 outlined above.

There is a need for a method whereby lignin material, suitable for utilization as fuel in the lime kiln of a pulp mill, may be recovered from black liquor without a large consumption of acid in the washing process.

DESCRIPTION OF THE INVENTION

The present invention is a new method of utilizing lignin-containing material separated from spent kraft pulping liquor (black liquor) by first acidifying the liquor, or fraction thereof, to a pH not less than 7 thereby precipitating solid particles, separating precipitated solid particles from the accompanying liquid and then subjecting material thus separated to a certain type of washing process. The washing process exhibits the following essential features:
  i. separated material is washed with an aqueous medium or aqueous media in one or more steps
  ii. in each washing step, the washing medium contains, in a dissolved form, significant amounts of one or more added sodium salts, as well as possible other compounds, and
  iii. the combined concentration of the added sodium salts in the washing medium in each washing step exceeds 3% by weight.

The washed lignin may be partially or completely dried before utilization. The essence of the present invention is that at least part of the lignin-containing material prepared in this way is utilized as fuel in a lime kiln of a pulp mill. Preferably all the washing steps are conducted without any addition of acid.

As mentioned earlier, washing lignin separated from black liquor with salt solution is a known method of minimizing lignin re-dissolution during washing and thereby decreasing the amount of acid required compared to the traditional method based on washing with acidic solution at low pH, e.g. pH 2, in the first washing step. An example of a process employing salt solution in this known way is disclosed in US2008/0214796A1. In this process, the final two washing steps are conducted with acidic solutions to which salts have not been added. The aim of the last washing step conducted with dilute acidic solution is to displace the impurities left entrained in the solids after the upstream washes performed with solutions of salt and acid. In other words, the aim is to produce a material comprised essentially of moist lignin, only, with minimal amounts of impurities, including those originating from the salt added in the first washing or dilution step.

The present method deviates essentially from that disclosed in US2008/0214796A1, as well as from all other related prior art such as U.S. Pat. No. 2,623,040, by employing relatively concentrated salt solutions as washing media in all washing steps—and thus purposefully allowing part of the dissolved added salts to remain entrained within the lignin solids—and then using this lignin-containing material which has an exceptionally high sodium content as fuel in a lime kiln of a pulp mill. For the purposes of the present method, the combined concentration of the added sodium salts in the washing medium employed in each washing step exceeds 3% by weight, preferably exceeds 5% by weight, and most preferably exceeds 10% by weight. Usually the highest concentration level employed in the present method corresponds to that of a saturated solution with respect to the sodium salts in question.

In the present method, the content of sodium in the washed lignin material is much greater—typically an order of magnitude greater—than the sodium content traditionally permitted in lime-kiln fuel. Surprisingly, the lignin-containing material prepared in the present way may, nonetheless, be employed as lime-kiln fuel. This is a consequence of the particular forms of occurrence of sodium in the present material. The thinking of the prior art has been that the known restrictions on the amount of sodium that may enter the kiln with the lime mud are applicable, as such, to the lime-kiln fuel. For example, this deduction pathway is explicitly laid out in the following two related publications: Uloth V. C. and Wearing J. T., Pulp Paper Canada, 90 (1989) 9, pp. T310-T314 and Uloth V. C. and Wearing J. T., Pulp Paper Canada, 90 (1989) 10, pp. T357-T360.

From the point of view of the lime-kiln furnace process, both sodium-containing and sulphur-containing compounds entering the kiln with the lime mud are potentially problematic. In particular, sodium and sulphur compounds dissolved in the diluted white liquor entrained with the limestone in the mud are prone to cause problems. In other words, the compounds NaOH and $Na_2S$, dissolved in entrained diluted white liquor, are those that are potentially the most problematic. These days the main potential problem of sodium input with the lime mud is increased propensity for ring-like deposit build-up in the kiln. Ring formation reduces the availability of the kiln and increases maintenance costs. The detrimental effects of sodium compounds may be due to (1) the melting of sodium compounds present in the lime mud and/or (2) the release of volatile sodium compounds, such as elemental sodium (Na) and NaOH, in the high-temperature zone of the kiln. The volatilized sodium compounds condense in colder parts of the kiln. Alkali-fume particles are formed. Sodium vapour compounds may also condense directly onto the lime mud and/or kiln wall. Most of the fume particles exit the lime kiln with the flue gas and, together with entrained limestone particles, are separated from the flue gas before the gas is discharged to the atmosphere. Typically, the separated dust particles are recycled directly to the lime kiln and the levels of sodium within the kiln are thereby increased. Withdrawal of lime-kiln dust from the lime-kiln process, i.e. partial opening up of the lime-dust circuit, is a way to restrict the build-up of sodium levels within the kiln.

Sulphur introduced with the lime mud is problematic when it is in a form from which reduced sulphur gases may be released before the lime mud has reached the high-temperature zone in the kiln. Such gases may exit the kiln in a reduced form and thus directly contribute to the emission of reduced sulphur gases from the kiln. Sulphur in the $Na_2S$ entrained in the lime mud is the dominating source of problematic sulphur. Because the amount of entrained $Na_2S$ relative to that of entrained NaOH is largely set by the sulphidity of the white liquor, it is possible to monitor the levels of both on the basis of the amount of soluble alkali in the lime mud. As pointed out earlier, a typical recommended limit is a soluble alkali content in the lime mud, calculated as sodium oxide ($Na_2O$), of 0.3% of the weight of lime-mud dry matter.

In the lignin-containing material produced in the washing method incorporated in the present approach there are typically two primary sources of the high amount of sodium in the material:
  sodium originating from sodium salts dissolved in the aqueous washing medium or media
  sodium still bound to lignin.

According to the present method, the combined concentration of the added sodium salts in the washing medium employed in each washing step exceeds 3% by weight, preferably exceeds 5% by weight, and most preferably exceeds 10% by weight. If, for example, a solution containing 10% by weight of dissolved sodium salts is employed as the washing medium in each of two re-slurry washing steps in which the weight of added wash medium is four times the weight of lignin dry matter, the amount of sodium originating from the added salt material and ending up in the final lignin product would correspond to a sodium content of the order of 5% of lignin dry matter. In preferred embodiments of the new method, little or no acid is employed when washing the lignin, in which case some sodium remains bound to the lignin, mainly to its carboxylic functional groups. With no utilization of acid, the content of bound sodium is of the order of 2% of the lignin dry matter. Thus, the total sodium content of the lignin-containing material produced as described above could be around 7% of lignin dry matter. This level is an order of magnitude higher than the level aimed for in the prior art when lignin is to be utilized as lime-kiln fuel. For example, the method disclosed in U.S. Pat. No. 8,252,141B2 produces lignin with a sodium content below 1% of lignin dry matter. Because the content of sodium in the lignin-containing material produced in accordance with the present method is much greater than the low sodium content which, according to the prior art, needs to be reached in order to enable lignin to be utilized as lime-kiln fuel, a person skilled in the art would not consider the present method obvious on the basis of the prior art.

The salt solutions preferably employed in conjunction with the present method are ones which contain $Na_2SO_4$ as the main, if not the only, dissolved salt compound. As discussed above, sodium compounds encountered in the main chemical recovery cycle are, in general, detrimental for the lime-kiln furnace process. However, $Na_2SO_4$ does not release Na, NaOH or reduced sulphur gases when subjected to the temperatures encountered throughout the lime kiln. $Na_2SO_4$ can exist in a gaseous form but its boiling point is relatively high: about 1430° C. According to the article, Richardson, B., et al, Combustion of lignin in a pilot lime kiln, Tappi Journal, 73 (12): 133-137 (1990), the maximum temperature reached in the gas stream of a lignin-fired lime kiln is about 1250° C. Thus, when lignin-containing material, which has been prepared using solutions of $Na_2SO_4$ as wash media, is utilized as lime-kiln fuel, the major part of the $Na_2SO_4$ in the fuel remains in the condensed phase and ends up in the form of small residual particles. These particles add to the amount of alkali dust entrained in the combustion gases. The presence of $Na_2SO_4$ in the fuel does not, however, measurably increase the amount of volatilized sodium compounds. Thus, if the enhancing effect of alkali on ring formation mainly results from condensation of alkali vapour on, say, lime mud, $Na_2SO_4$ in the fuel will not measurably affect ring formation.

Obviously, if the enhancing effect of alkali mainly results from the melting of alkali compounds entering with the lime-mud stream, $Na_2SO_4$ contained in the fuel cannot directly influence ring formation. However, when lime-kiln dust is, as usual, recycled to the kiln, $Na_2SO_4$ in the fuel indirectly increases the amount of sodium compounds in the lime mud and thereby may indirectly enhance ring formation. In other words, significant withdrawal of lime-kiln dust from the lime-kiln process may be necessary in conjunction with the application of the present method. Some or all of the withdrawn lime-kiln dust could be recycled to the calcium cycle of the pulp mill at a location somewhere upstream of the lime kiln. For example, the dust could be added to diluted lime-mud slurry before the final dewatering and washing stage or it could be added to the lime-milk stream upstream of the device for separating lime mud from white liquor. In both cases, most of the sodium compounds in the dust would be returned to the main chemical recovery cycle of the mill. In summary, by opening up the lime-kiln dust circuit to the degree necessary, the impacts of $Na_2SO_4$ in the fuel on ring formation can be kept at a minimum. As stated above, $Na_2SO_4$ does not release reduced gases and so does not measurably add to the amount of problematic sulphur compounds entering the kiln.

Fly ash from a chemical recovery boiler of a pulp mill, e.g. in the form of dust collected by an electrostatic precipitator, is the obvious source of sodium salts for application in a lignin-washing step employing a solution of one or more sodium salts as the washing medium. The dominating component of recovery-boiler fly ash is $Na_2SO_4$, while the next most prevalent compound is $Na_2CO_3$. The ash also contains small amounts of non-process elements such as chlorine and potassium. The content of $Na_2SO_4$ is typically in the range 65-90%, while that of $Na_2CO_3$ is typically in the range 5-20%. Although $Na_2CO_3$ does not exist in a gaseous form and thus cannot be volatilized as such, some of it may be reduced by carbon during combustion of the lignin fuel and thereby be converted into volatile Na. However, in practice, the extent of sodium release from $Na_2CO_3$ is small because, among other things, lignin and $Na_2CO_3$ are present as separate phases within the lignin material. Thus, like $Na_2SO_4$ in the fuel, the major part of any $Na_2CO_3$ in the fuel remains in the condensed phase and ends up in small residual particles. Recovery-boiler fly ash is therefore a suitable salt material for use in conjunction with the present method.

In the normal kraft-recovery process, a significant part, if not all, of the fly ash is recycled to the black-liquor stream and thus re-introduced into the furnace of the recovery boiler. The filtrates from the lignin separation and washing steps are also typically recycled to the main black-liquor stream, usually to locations in the evaporation plant of the mill. Thus, if salt solution prepared from recovery-boiler fly ash is employed for washing lignin, the salt is, in effect, procured for washing purposes at virtually zero cost. Instead of being recycled directly to the black-liquor stream, the salt is recycled via one or more lignin-washing steps. Note that, provided the amount of recovery-boiler fly ash needed for lignin washing is less than the total amount recycled, which is, in fact, highly likely, use of recovery-boiler fly ash for lignin washing does not disturb the sodium-sulphur balance of the mill. For the above reasons, recovery-boiler fly ash is the most preferred salt material for use in conjunction with the present method.

Some of the sodium remaining bound to lignin may also be released during combustion of the lignin. Based on information about the behaviour of sodium during black-liquor combustion, it may be deduced that sodium bound to lignin is first converted to $Na_2CO_3$, after which some of the $Na_2CO_3$ is reduced by carbon to form volatile Na. However, the extent of release of sodium according to this mechanism is relatively small. For example, in the case of combustion of black liquor, only about 10% of all the black-liquor sodium is released.

Thus, overall, when recovery-boiler fly ash is employed as the added salt in the washing process applied in the present method, the resulting lignin-containing material may be employed as the main fuel in a lime kiln at a pulp mill despite the fact that much more sodium is introduced into the kiln with the fuel than is allowed to be introduced with the lime mud.

At many pulp mills $Na_2SO_4$ is employed as a make-up chemical. Obviously, this make-up salt can be exploited in the present method. High concentrations of $Na_2SO_4$ are also found in certain internal aqueous streams of some pulp mills. It may be possible to employ such streams, either as such or as additives, in the present method.

The lignin-containing material prepared according to the present method contains some sulphur bound to the lignin matrix. This is also the case for lignin produced according to the conventional method, i.e. according to Steps 1-4 outlined earlier. In other words, in contrast to the case of sodium, this bound sulphur cannot be liberated by employing acid in conjunction with washing of the lignin. Any reduced sulphur compounds released from fuel entering the kiln at the hot end are completely or nearly completely oxidized to sulphur dioxide ($SO_2$) and are thereby less problematic than those released from the lime-mud stream. This has been verified in lime-kiln tests in which lignin produced in the conventional way has been successfully fired as fuel (Berglin, N., et al, Experiences from feeding and co-firing of lignin powder in a lime kiln, Proc. 2010 International Chemical Recovery Conference, Vol. 1, TAPPI Press, Atlanta, pp. 175-187).

The known methods of recovering lignin from black liquor for utilization as lime-kiln fuel employ a significant amount of acid, usually $H_2SO_4$, in the lignin-washing process. These methods are either based entirely on the traditional process outlined earlier (Steps 1-4) or, in addition, they incorporate initial washing with salt solution as disclosed, for example, in US2008/0214796A1. In the latter case, as acknowledged in that patent document, a significant amount of acid—although less than that required in the traditional method—is still required in the next washing step. Acid is required in order to avoid major re-dissolution of lignin when displacing salts remaining entrained within the lignin solids after the first washing step. Because, in the present method, there is no need to displace entrained salts originating from the salts added in the washing steps, the use of acid in the washing sequence is unnecessary and may be entirely avoided in the present method. This constitutes a very substantial economic advantage for the present method over known methods, particularly when recovery-boiler fly ash is the salt employed in the present method.

In one embodiment of the invention, all the lignin-containing material produced at a pulp mill according to the present method is employed as the fuel in a lime kiln of the mill.

In another embodiment of the invention, all the lignin-containing material produced at a pulp mill according to the present method is utilized as one of several fuels employed in a lime kiln of the mill.

In yet another embodiment of the invention, a part of the lignin-containing material produced at a pulp mill according to the present method is employed as fuel in a lime kiln of the mill.

In yet another embodiment of the invention, a part of the lignin-containing material produced at a pulp mill according to the present method is employed as fuel in a lime kiln of the mill and the rest of the material is further washed in one or more steps, with at least one of the steps being undertaken under acidic conditions, in order to reduce the sodium content of the rest of the lignin-containing material.

In yet another embodiment of the invention, some or all of the lignin-containing material produced at a pulp mill according to the present method is employed as fuel in a lime kiln of another pulp mill.

SUMMARY OF THE DRAWINGS

The present new method is described in more detail with reference to the drawings, FIG. 1 and FIG. 2, each depicting one embodiment of the invention. The numbers and letters in FIG. 1 and FIG. 2 refer to the following streams and processing stages:

1. Lignin-containing material separated from acidified black liquor
2. Slurry formed in the wash step
3. Filter cake
4. Filtrate
5. Recovery-boiler fly ash
6. Water
7. Aqueous solution of recovery-boiler fly ash
8. Slurry formed in the wash step
9. Filter cake
10. Filtrate
11. Partially dried lignin-containing material for utilization as lime-kiln fuel
12. Filter cake
13. Filter cake
14. Concentrated $H_2SO_4$
15. Slurry formed in the wash step
16. Filter cake
17. Filtrate
18. Water
19. Slurry formed in the wash step
20. Filter cake
21. Filtrate
22. Partially dried lignin-containing material having a lower sodium content than the material (stream 11 above) utilized as lime-kiln fuel
A. Re-slurry wash vessel
B. Filtration device, with possible auxiliary devices for enhancing dewatering
C. Re-slurry wash vessel
D. Filtration device, with possible auxiliary devices for enhancing dewatering
E. Dryer
F. Dissolving vessel
G. Re-slurry wash vessel H. Filtration device, with possible auxiliary devices for enhancing dewatering
I. Re-slurry wash vessel
J. Filtration device, with possible auxiliary devices for enhancing dewatering
K. Dryer

DETAILED DESCRIPTION OF THE INVENTION

Figure 1:
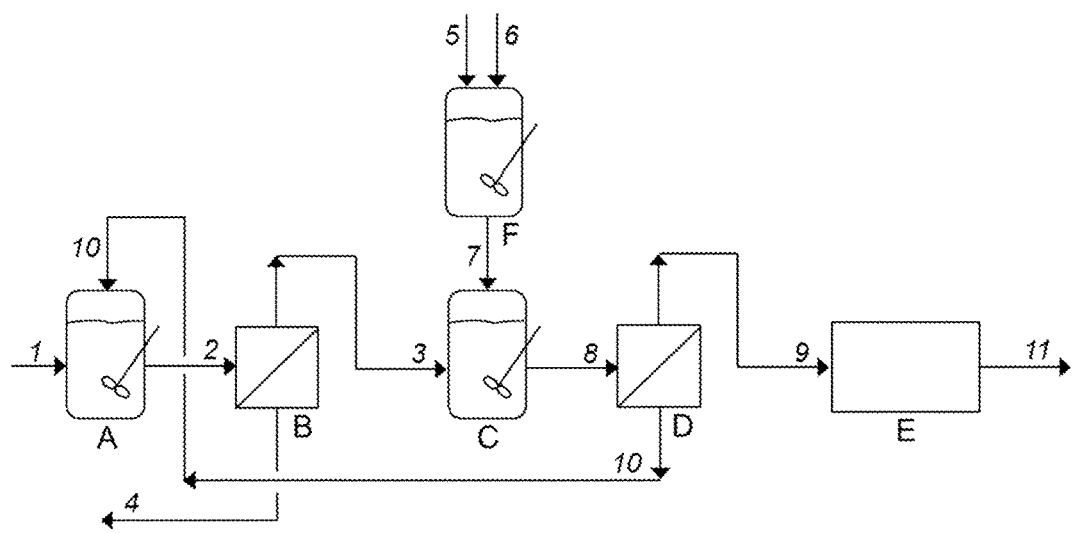

The embodiment depicted in FIG. 1 employs a two-step counter-current washing scheme. The filtrate (10) exiting the second washing step is recycled to the first wash vessel (A) to be utilized as washing medium in the first washing step. In this embodiment, both washing steps employ the re-slurry wash principle. The material (1) fed to the washing process has been obtained by first acidifying spent alkaline pulping liquor and then separating the particles thus precipitated from the liquor. Filtration is the usual method of separation, in which case the feed material (1) is in the form of a moist filter cake. This material is re-slurried with recycled filtrate (10) in the first wash vessel (A). The slurry (2) formed in the wash vessel (A) is led to a filtration device (B). The filtrate (4) is returned to the chemical recovery cycle of the mill. For example, it is added to the main black-liquor stream at a location in the black-liquor evaporation plant. In the second wash vessel (C), the filter cake (3) produced in the first washing step is re-slurried with wash solution (7) prepared by dissolving recovery-boiler fly ash (5) in water (6) in the dissolving vessel (F). The slurry (8) formed in the wash vessel (C) is led to a filtration device (D). The filtrate (10) is recycled to the first wash vessel (A) to be employed as the washing medium therein. The amount of added fly ash (5) is such that the combined concentration of added sodium compounds in both the washing medium (10) employed in first wash step and the washing medium (7) employed in the second wash step exceeds 3% by weight, preferably exceeds 5% by weight, and most preferably exceeds 10% by weight. The filter cake (9) from the second step is partially dried in the dryer (E) and the partially dried lignin-containing material (11) is utilized as fuel in the lime kiln of the pulp mill. Acid is not employed in the washing process of FIG. 1, which means major cost savings in comparison to the costs of the conventional lignin-washing process (Steps 3 and 4 outlined earlier).

Figure 2:
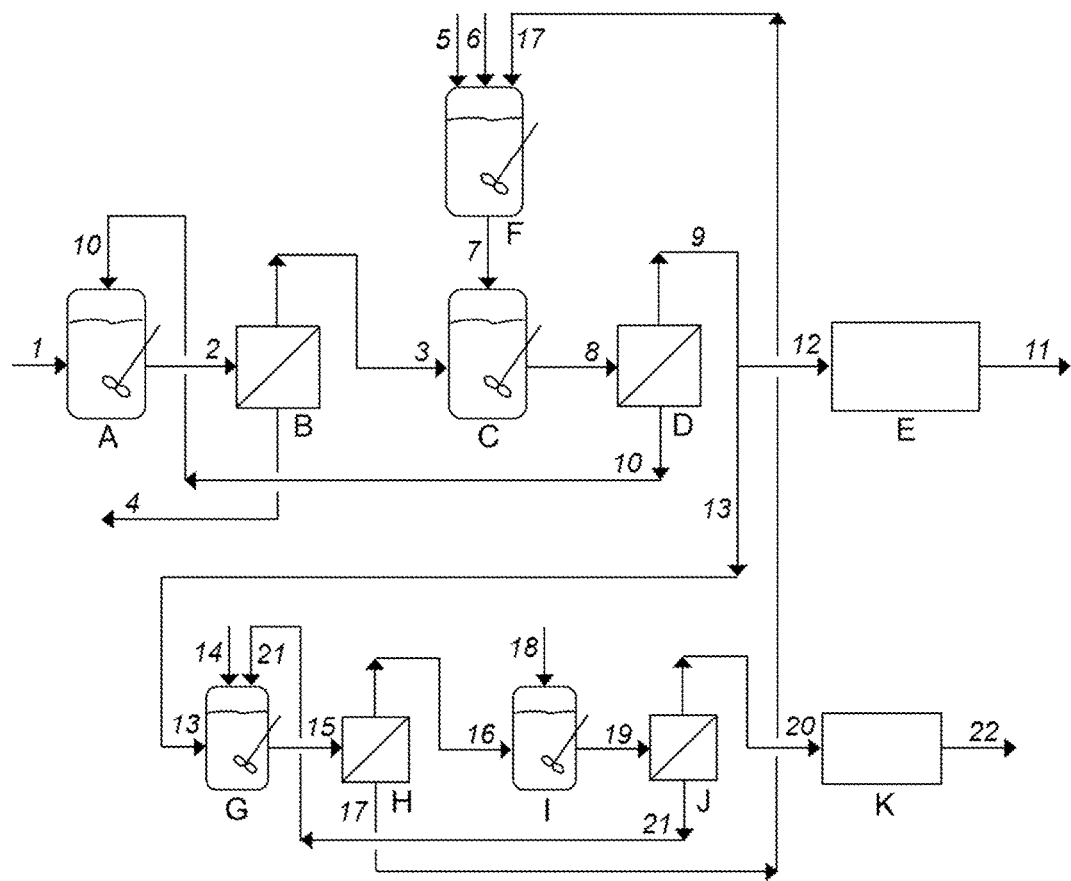

In the embodiment depicted in FIG. 2, only part of the lignin-containing material prepared according to the present method is used as fuel in the lime kiln of the pulp mill. The rest is further washed to reduce the content of sodium in the material and thus to widen the range of potential applications for the material. For example, lignin-containing material that has been further washed could be sold outside the pulp mill. The process in which the lignin-containing material is further washed follows Steps 3 and 4 of the conventional lignin-recovery process outlined earlier. A two-step counter-current washing scheme is employed and the re-slurry washing principle is employed in each step. The spent wash solution, filtrate (17), from this second washing section is recycled to the dissolving vessel (F) in the first washing section so that the complete washing process of the embodiment of FIG. 2 is carried out in counter-current fashion. The net spent wash solution of the whole process is the filtrate (4) from the first filtration device (B).

Referring to FIG. 2, a filter cake (9), prepared by separating lignin-containing material from acidified black liquor and washing it with the method applicable to the present invention, is split into two streams (12, 13). As in the embodiment of FIG. 1, a filter cake (12) is partially dried in the dryer (E) and the partially dried lignin-containing material (11) is utilized as fuel in the lime kiln of the pulp mill. A filter cake (13) is re-slurried with recycled filtrate (21) and concentrated $H_2SO_4$ (14) in the re-slurry wash vessel (G). The final pH value reached in this washing step is around 2. The slurry (15) formed in the wash vessel (G) is led to a filtration device (H). The filtrate (17) is led to the dissolving vessel (F). The filter cake (16) is re-slurried with water (18) in the re-slurry wash vessel (I). The slurry (19) formed in this vessel is led to the filtration device (J). The filtrate (21) is recycled to the re-slurry wash vessel (G). The filter cake (20) is partially dried in the dryer (K) yielding a lignin-containing material (22) having a lower sodium content that that of the material (11) employed as lime-kiln fuel. As indicated in FIG. 2, the equipment employed in the second washing section (lower part of FIG. 2) is, in general, smaller in size than the corresponding equipment in the first washing section (upper part of FIG. 2) because of the smaller amount of lignin material handled in the second washing section. The embodiment depicted in FIG. 2 obviously consumes less $H_2SO_4$ than would a corresponding process in which the conventional lignin-washing process (Steps 3 and 4 outlined earlier) were applied to all the lignin material (1) initially separated from the black liquor.

Variants of these embodiments include those employing the same multi-step washing schemes but with one or more of the wash steps employing the displacement wash principle rather than the re-slurry wash principle. For example, the second wash steps in the two-step washing sequences shown in FIGS. 1 and 2 may be carried out as displacement washes on the filtration devices employed in the first steps, thus eliminating the re-slurry wash vessels and the filtration devices from the second steps. In other variants, the first, and possibly only, washing step is carried out as a displacement wash on the separation device, typically a filtration device, that is employed for the initial separation of particles precipitated in the black-liquor acidification step. As a result, the re-slurry wash vessel and the filtration device required for a first wash step employing the re-slurry wash principle (e.g. as in FIGS. 1 and 2) are no longer needed. As disclosed in US2008/0214796A1, salt solution may also be used for diluting the slurry of precipitated particles prior to the first separation step. This obviously decreases the amount of washing required after the separation step.

The embodiments of the present invention are not limited to those mentioned or described herein.

The invention claimed is:

1. A method of utilizing lignin-containing material separated from spent kraft pulping liquor comprising:
   acidifying the liquor, or fraction thereof, to a pH not less than 7 thereby precipitating solid particles,
   separating the precipitated solid particles from the liquor or a fraction thereof, and
   subjecting the separated precipitated solid particles to a washing process in which:
   i. the separated precipitated solid particles are washed with an aqueous medium or aqueous media in at least two washing steps,
   ii. in each of the at least two washing steps, the aqueous washing medium or media contains, in a dissolved form, significant amounts of one or more added sodium salts, and
   iii. a combined concentration of the one or more added sodium salts in the aqueous washing medium or media in each of the washing step exceeds three percent (3%) by weight;

iv. utilizing as fuel in a lime kiln at least part of the washed, separated precipitated solid particles.

2. The method according to claim 1, wherein the combined concentration of the one or more added sodium salts in the aqueous washing medium or media in each washing step exceeds 5% by weight.

3. The method according to claim 1, wherein acid is not added to any of the at least two washing steps.

4. The method according to claim 1, wherein sodium sulphate is included in the one or more added sodium salts.

5. The method according to claim 1, wherein a source of the one or more added sodium salts dissolved in the aqueous washing medium or media is fly ash from a chemical recovery boiler of a pulp mill.

6. The method according to claim 1, wherein a source of the one or more added sodium salts dissolved in the aqueous washing medium or media is an internal aqueous stream in a pulp mill.

7. The method according to claim 1, wherein a part of the washed, separated precipitated solid particles is further washed in one or more steps, with at least one of the steps being undertaken under acidic conditions, in order to reduce the sodium content of the washed, separated solid precipitated solid particles used as the fuel.

8. The method according to claim 1, wherein at least a part of the dust separated from the flue gas exhausted by the lime kiln is not recycled directly to the lime kiln.

9. The method as in claim 8, wherein the at least part of dust that is not recycled directly to the lime kiln is recycled to a calcium cycle of a pulp mill at a location upstream of the lime kiln.

10. A method comprising:
acidifying spent kraft pulping liquor or fraction of the liquor to a pH of not less than 7 to precipitate solid lignin-containing particles;
separating the precipitated solid lignin-containing particles from the liquor or the fraction;
in each of at least two washing steps, washing the separated precipitated solid lignin-containing particles with an aqueous liquid that includes at least one sodium salt, wherein a concentration of all of the at least one sodium salt is at least three percent (3%) by weight, and
fueling a lime kiln with the washed precipitated solid lignin-containing particles.

11. The method of claim 10, wherein in each of the at least two washing steps, the washing of the precipitated solid lignin-containing particles is performed without addition of an acid.

12. The method of claim 10, wherein the concentration exceeds five percent.

13. The method of claim 10, wherein the at least one sodium salt includes sodium sulphate.

14. The method of claim 10, further comprising obtaining the at least one sodium salt from fly ash from a chemical recovery boiler of a pulp mill.

15. The method of claim 10, further comprising obtaining the at least one sodium salt from an aqueous stream in a pulp mill.

16. The method of claim 10, further comprising washing a portion of the washed precipitated solid lignin-containing material under an acidic condition and thereby reducing a sodium content of the portion of the washed precipitated solid lignin-containing material.

17. A method comprising:
precipitating lignin-containing material from spent kraft pulping liquor or a fraction of the liquor by acidifying the liquor or the fraction to a pH of not less than seven (7);
separating the precipitated lignin-containing material particles from the liquor or the fraction;
in each of at least two washing steps, washing the separated precipitated lignin-containing material using an aqueous liquid having a sodium salt concentration of at least three percent (3%) by weight, and
fueling a lime kiln with the washed precipitated lignin-containing material.

18. The method of claim 17 wherein the washing of the precipitated solid lignin-containing material is performed without addition of an acid.

19. The method of claim 17 further comprising adding fly ash from a chemical recovery boiler of a pulp mill to the aqueous liquid to increase the sodium concentration to the at least three percent.

20. The method of claim 17 further comprising adding sodium salt to the aqueous liquid to raise the sodium concentration to the at least three percent.

* * * * *